June 9, 1964
R. W. NICKERSON
3,136,014
SAFETY PIN WITH PIN-CONNECTING MEANS
Filed Sept. 17, 1962
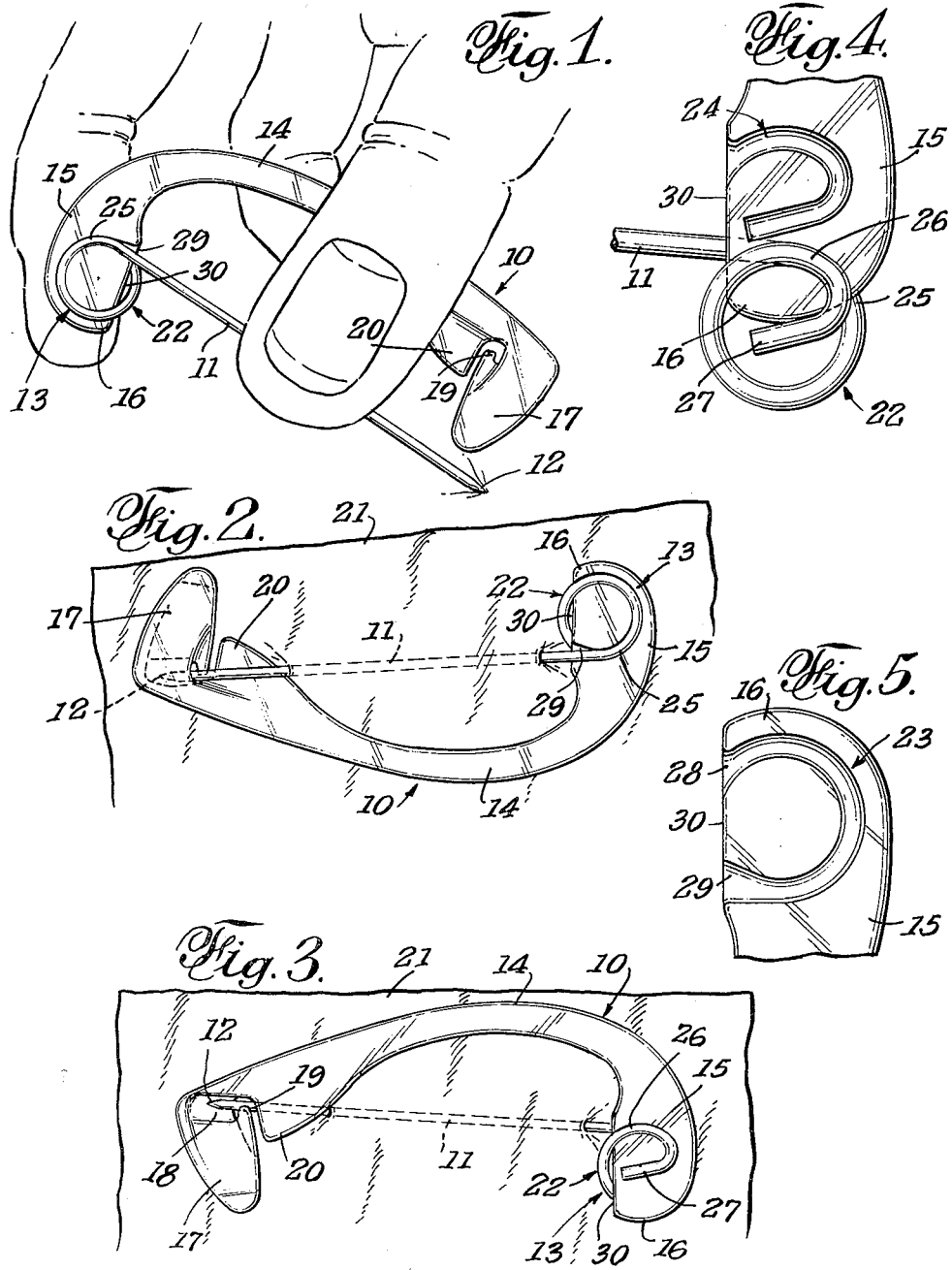
INVENTOR.
RICHARD W. NICKERSON
BY
ATTORNEY

United States Patent Office 3,136,014
Patented June 9, 1964

3,136,014
SAFETY PIN WITH PIN-CONNECTING MEANS
Richard W. Nickerson, 5261 Sierra Villa Drive,
Los Angeles, Calif.
Filed Sept. 17, 1962, Ser. No. 224,164
8 Claims. (Cl. 24—161)

This invention relates to a safety pin with pin-connecting means.

The device embodying the present improvement comprises a molded synthetic plastic frame, a piercing pin member, and novel and improved means for connecting the pin member to the frame to provide for automatic return of the pin from a flexed condition to a safely closed condition. It is an object of this invention to provide such connecting means.

Another object of the invention is to provide pin-connecting means of the character referred to that has spring-retention engagement with a frame as indicated, thereby enabling film and efficient slip-on assembly of the connecting means.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a perspective view showing the present safety pin in open condition preparatory to be applied.

FIG. 2 is an elevational view showing the safety pin after its application to a piece of material.

FIG. 3 is a similar view showing the safety pin rotated on its pin member after application as in FIG. 2.

FIG. 4 is an enlarged fragmentary view showing a pin and frame connecting means in the process of being connected.

FIG. 5 is a view similar to FIG. 4 of the opposite face of the frame portion that is shown in FIG. 4.

The safety pin that is illustrated comprises, generally, an approximately C-shaped synthetic plastic frame 10, a preferably straight pin member 11 having a point 12, and means 13 to interconnect the pin member 11 and the frame 10 so the former, from a flexed conditioned, will seek a straight position with its point having pin-closing engagement with the frame.

The present frame 10 may be made of a tough high-impact resin, such as acrylic, phenolic and other substantially rigid synthetic resins, production thereof by molding being prefered. As shown, said frame integrally comprises an arched shank 14, an end 15 that embodies part of the interconnection means 13 and including an anti-rotation extension 16, an anti-rotation extension 17 on the opposite end of the shank 14, a recess or well 18 at said latter end to house the point 12 of the pin member 11, a projection 19 on the extension 17 in opposition to said recess 18, the pin point 12 residing between said projection 19 and the bottom of said recess, and a guide shield 20 extending from the shank 14 in overstanding relation to the pin member 11 immediately inward of the point 12 thereof.

To apply the above generally-described safety pin, the pin member 11 is pressed first laterally outwardly from the well 18 and then in a direction away from the shank 14, as shown in FIG. 1. The pin point 12 is then threaded through material 21 to be pinned, substantially as shown in FIGS. 2 and 3. Now, when the pressure on the pin member is released, the pointed end of the same under bias of the connecting means 13, will flex back into the well by passing between opposed faces of the extension 17 and the guard 20. When the pin end snaps past the end of the projection 19, the same will now be safely housed in the well 18, as illustrated in FIG. 3.

The means 13 constitutes both means to mount the pin member 11 on the frame end 15 and to provide the pin member with resilient bias to cause automatic return of the member to closed position, as above described. Said means 13 comprises, generally a closed loop 22 and housing grooves 23 and 24 formed in the opposite sides of the frame end 15 for receiving said loop 21, by a snap-retention engagement.

As best seen in FIG. 4, the loop 22 extends from the pin member 11, first, in a loop part 25 and then in a superimposed or overlayed loop part 26 that terminates in a keying end 27 which is here shown as a straight inwardly bent end of the loop. Since the member 11 is formed of flexible and springy wire, the two superimposed parts 25 and 26 may be flexed apart to form a space therebetween and which seeks to close due to the bias of said parts in a direction toward each other.

The housing groove 23 preferably has a depth at least half the diameter of the wire and preferably somewhat deeper, the same having a form that conforms to the loop part 25, as can be seen from FIGS. 4 and 5. Said groove 23 has a generally C shape with ends 28 and 29 terminating at an edge 30 defining the inner edge of the end 15. Said end 29 of the groove 23 may have a flared form to allow flexure of the pin member 11 without creating any forces that may tend to raise the loop part 25 out of its seat in the groove 23 yet, when the pin member 11 is pressed as described, during application of the pin, said loop part 25 may lift slightly out of its groove.

The groove 24 conforms to the shape of the loop part 26 and the end 27 on said part, as can be seen in FIG. 4. The depth of seat of this groove is also deep enough to be retentive of said part 26 and end 27.

FIG. 4 shows how the closed loop 22 may be spread, as above indicated, and pressed in a direction to be resiliently forced over the extension 16 of the frame end 15. It will be evident that when the loop parts 25 and 26 snap into their respective grooves 23 and 24, as shown in FIGS. 1, 2 and 3, said loop 22 is retained against rotation by the keying end 27 and the pin member 11 may be flexed, as described, for application of the safety pin, and will automatically return the pin point to safe housing in the well 18.

While the loop 22 is shown as circular with the keying portion angularly bent to lie on an approximate diameter of said loop, the latter may have an oval or other non-round form, with the seats or grooves therefor conforming. Such non-round loops will not turn, thereby having the same anti-rotation effect as has the end 27 in its groove.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. A safety pin comprising
   (a) a rigid frame having opposite end portions, (b) a pin member with a pointed end operatively separably engageable with one of said frame end portions, and (c) snap-retention means to non-rotationally interconnect only the opposite end of the pin member and the other of said frame end portions and comprising a flat-wise inter-engagement of said opposite end of the pin and said other frame end portion.

2. A safety pin comprising
   (a) a rigid frame having opposite end portions,
   (b) a pin member with a pointed end operatively separably engageable with one of said frame end portions, and
   (c) snap-retention means comprising a loop having two superimposed and integral loop parts provided on the opposite end of the pin member and seats in the opposite sides of the other of said frame end portions receptive of and in snap-retention engagement with said loop parts, said latter means interconnecting and retaining assembled said opposite end of the pin member and said other frame end portion.

3. A safety pin comprising
   (a) a rigid frame having opposite end portions,
   (b) a pin member with a pointed end operatively separably engageable with one of said frame end portions,
   (c) snap-retention means comprising a loop having two superimposed loop parts provided on the opposite end of the pin member and seats in the opposite sides of the other of said frame end portions receptive of said loop parts, said latter means interconnecting said opposite end of the pin member and said other frame end portion, and
   (d) one loop part being provided with an anti-rotation keying portion, and the seat for said loop part conforming to said keying portion to hold the loop non-rotational during flexure of the pin member.

4. In a safety pin having a frame and provided with a pin member that is flexible and non-pivotal relative to the frame between open and closed position,
   (a) a resilient closed loop provided on one end of the pin member and formed of two superimposed integral loop parts, and
   (b) seats formed in said frame on both side faces thereof to receive therein said two loop parts by snap-retention engagement.

5. In a safety pin having a frame and provided with a pin member that is flexible and non-pivotal relative to the frame between open and closed positions,
   (a) a resilient closed loop provided on one end of the pin member and formed of two superimposed and integral loop parts, and
   (b) seats formed in said frame on both side faces thereof to receive therein said two loop parts by snap-retention engagement, one of said loop parts being provided with a keying portion and the seat receptive of said latter portion conforming thereto.

6. In a safety pin having a frame and provided with a pin member that is flexible and non-pivotal relative to the frame between open and closed positions,
   (a) a resilient closed loop provided on one end of the pin member and formed of two superimposed and integral loop parts, and
   (b) seats formed in said frame on both side faces thereof to receive therein said two loop parts by snap-retention engagement, said closed loop having a circular form and one of the loop parts being provided with a portion offset from said circular loop and the seat receptive of said latter portion conforming thereto.

7. In a safety pin having a frame and provided with a pin member that is flexible and non-pivotal relative to the frame between open and closed positions,
   (a) a resilient closed loop provided on one end of the pin member and formed of two superimposed and integral loop parts, and
   (b) seats formed in said frame on both side faces thereof to receive therein said two loop parts by snap-retention engagement,
   (c) one loop part being provided with an anti-rotation keying portion, and the seat for said loop part conforming to said keying portion to hold the loop non-rotational during flexure of the pin member.

8. In a safety pin having a frame and provided with a pin member that is flexible and non-pivotal relative to the frame between open and closed positions,
   (a) a resilient closed loop provided on one end of the pin member and formed of two superimposed and integral loop parts, and
   (b) seats formed in said frame on both side faces thereof to receive therein said two loop parts by snap-retention engagement, one of said loop parts being provided with a keying portion and the seat receptive of said latter portion conforming thereto,
   (c) one loop part being provided with an anti-rotation keying portion, and the seat for said loop part conforming to said keying portion to hold the loop non-rotational during flexure of the pin member.

References Cited in the file of this patent

UNITED STATES PATENTS

| 370,411 | Pruim | Sept. 27, 1887 |
| 1,432,039 | Ryan | Oct. 17, 1922 |
| 1,556,509 | Hochreiner | Oct. 6, 1925 |
| 3,018,533 | Bagnasco | Jan. 30, 1962 |

FOREIGN PATENTS

| 63 | Great Britain | 1868 |
| 7,807 | Great Britain | Mar. 29, 1911 |